US012351388B2

(12) United States Patent
Dunne

(10) Patent No.: US 12,351,388 B2
(45) Date of Patent: Jul. 8, 2025

(54) REFUSE RECEPTACLE

(71) Applicant: John Dunne, Dublin (IE)

(72) Inventor: John Dunne, Dublin (IE)

( * ) Notice: Subject to any disclaimer, the term of this patent is extended or adjusted under 35 U.S.C. 154(b) by 48 days.

(21) Appl. No.: 18/023,898

(22) PCT Filed: Aug. 26, 2021

(86) PCT No.: PCT/EP2021/073648
§ 371 (c)(1),
(2) Date: Feb. 28, 2023

(87) PCT Pub. No.: WO2022/048991
PCT Pub. Date: Mar. 10, 2022

(65) Prior Publication Data
US 2023/0312233 A1 Oct. 5, 2023

(30) Foreign Application Priority Data
Sep. 1, 2020 (IE) .................................... 2020/0194

(51) Int. Cl.
*B65F 1/00* (2006.01)
*B65F 1/16* (2006.01)

(52) U.S. Cl.
CPC ............ *B65F 1/002* (2013.01); *B65F 1/1646* (2013.01); *B65F 2220/101* (2013.01); *B65F 2220/1063* (2013.01)

(58) Field of Classification Search
CPC .............. B65F 2001/0086; B65F 1/002; B65F 2220/101; B65F 2220/1063; B65F 2220/106
See application file for complete search history.

(56) References Cited

U.S. PATENT DOCUMENTS

| | | | | |
|---|---|---|---|---|
| 6,073,943 | A | 6/2000 | Serrault | |
| 8,851,288 | B2 * | 10/2014 | Yamauchi | B65D 11/1833 206/506 |
| 2011/0215205 | A1 | 9/2011 | Sutphen | |
| 2020/0148468 | A1 * | 5/2020 | Munaro | B65F 1/1646 |

FOREIGN PATENT DOCUMENTS

EP 3384801 A1 10/2018

OTHER PUBLICATIONS

International Search Report and Written Opinion dated Dec. 23, 2021 in corresponding PCT Application No. PCT/EP2021/073648.

* cited by examiner

*Primary Examiner* — Jeffrey R Allen
(74) *Attorney, Agent, or Firm* — VITALE, VICKREY, NIRO, SOLON & GASEY LLP

(57) ABSTRACT

A refuse receptacle 10 comprising a plurality of wall panels 11, 12 joined to each other about a plurality of hinged joint arrangements 13. The refuse receptacle 10 comprises a first configuration being a generally planar storage configuration, and a second configuration, wherein the wall panels 11 are positionable relative to each other to form a receptacle having a refuse accepting space 14 defined by said plurality of wall panels 11. Advantageously, the refuse receptacle 10 can be quickly deployed for use from the first configuration to the second configuration, and returned to the first configuration for storage when use is complete.

19 Claims, 13 Drawing Sheets

REFUSE RECEPTACLE

This patent application is a 35 U.S.C 371 national stage application of International Patent Application No. PCT/EP2021/073648, filed on Aug. 26, 2021, which claims priority to Ireland Patent Application No. S2020/0194, filed on Sep. 1, 2020. All of these disclosures are hereby expressly incorporated by reference as part of the present disclosure as if fully set forth herein.

FIELD OF THE INVENTION

This invention relates to a refuse receptacle, and in particular to a refuse receptacle which may be easily stored when not in use.

BACKGROUND OF THE INVENTION

In virtually every city in the world, the issue of bags of refuse/waste left on inner city streets is an issue. This waste/refuse is generated mainly by businesses which occupy commercial premises.

These businesses have little or no space inside their premises for a refuse receptacle of a sufficient size to efficiently store the waste/refuse they produce. Even in cases where such space does exist, the space at the rear exterior of many commercial premises has little or no accessibility for a refuse collection vehicle to get to a receptacle for collection. In some cases residential premises located above commercial premises also generate waste/refuse bags, and share the issue in relation to storage of and collection of this refuse. Even in areas having no commercial premises, apartments and terraced houses also experience the aforementioned issue. Currently, the Municipality in question generally agrees that commercial and residential tenants who find themselves in the above referenced predicament are permitted to leave bags of waste/refuse on the streets between certain hours (5 pm-midnight, for example) and a refuse collection vehicle travels the streets at times of lower traffic to collect the bags. The problem with such a system is that, firstly, while the bags are on the streets awaiting collection they are very unsightly. However, more importantly, the bags are exposed to animals such as foxes, cats, dogs, rats, birds etc, all of whom rip the bags and distribute their contents creating a serious litter issue.

It is desirable to provide a refuse receptacle which will contain a sufficient amount of refuse such that it may be safely stored until collection, but be suitable for storage in a limited space when not in use.

SUMMARY OF THE INVENTION

According to the invention there is provided a refuse receptacle comprising a plurality of wall portions joined to each other about a plurality of movable joint means, wherein the refuse receptacle comprises a first configuration, being a generally planar storage configuration, and a second configuration, wherein the wall portions are positionable relative to each other to form a receptacle having a refuse accepting space defined by said plurality of wall portions.

Advantageously, the refuse receptacle can be quickly deployed for use from the first configuration to the second configuration, and returned to the first configuration for storage when use is complete.

Ideally, the wall portions are wall panels.

Preferably, each of the plurality of wall panels is joined to adjacent panels about a movable joint means.

Ideally, each of the plurality of wall panels comprise top and bottom edges, said top edges of the plurality of wall panels together defining an upper opening into the refuse accepting space in the second configuration.

Advantageously, in the second configuration, the upper opening may be used to easily access refuse contained in the refuse receptacle for collection, and/or to place refuse into the refuse receptacle.

Preferably, in the second configuration, the bottom edges of the plurality of wall panels together define a lower opening into the refuse accepting space, said lower opening opposing the upper opening.

Advantageously, in the second configuration, the lower opening permits the refuse receptacle to be placed over refuse located on the ground.

Ideally, each of the plurality of wall panels comprises two opposing side edges extending between their upper and lower edges such that each of the plurality of wall panels comprise generally quadrangular wall panels.

Most ideally, each of the plurality of wall panels comprises two opposing side edges extending between their upper and lower edges such that each of the plurality of wall panels comprise generally rectangular wall panels.

Preferably, each of the plurality of wall panels is joined to at least one adjacent wall panel by a movable joint means locatable along their respective side edges.

Ideally, the refuse receptacle comprises two wall panels joined along respective first side edges by a first movable joint means, and joined along respective second side edges by a second movable joint means.

Advantageously, the two wall panels form a continuous outer wall of the refuse receptacle.

Preferably, each of the plurality of wall panels are elastically deformable wall panels such that said each of the plurality of wall panels may bend to form a curvature in the second configuration and return to a flat/planar shape in the first configuration.

Ideally, the plurality of wall panels bend in the second configuration such that the refuse receptacle forms a generally cylindrical shaped refuse receptacle.

Preferably, the refuse receptacle comprises first movement restriction means which encourage the plurality of wall panels to remain in the first configuration.

Ideally, the first movement restriction means is adapted to retain the plurality of wall panels in the first configuration until application of a pre-determined level of force by a user urges the plurality of wall panels out of the first configuration such that the plurality of wall panels move into an intermediate configuration between the first and second configurations.

Advantageously, the refuse receptacle is encouraged to stay in the first configuration until ready for use rather than deploying unintentionally to the second configuration.

Preferably, the refuse receptacle comprises second movement restriction means which encourages the plurality of wall panels to remain in the second configuration.

Ideally, the second movement restriction means is adapted to retain the plurality of wall panels in the second configuration until application of a pre-determined level of force by a user urges the plurality of wall panels out of the second configuration such that the plurality of wall panels move into the intermediate configuration between the first and second configurations.

Advantageously, the refuse receptacle is encouraged to stay in the second configuration when in use rather than collapsing unintentionally to the first configuration.

Ideally, the refuse receptacle comprises a third movement restriction means which acts to retain the refuse receptacle in the intermediate configuration.

Preferably, the first and/or second and/or third movement restriction means are locatable on the movable joint means.

Ideally, the movable joint means are rotatable joint means.

Preferably, the movable joint means are hinged joint arrangements.

Preferably, the hinged joint arrangements comprise one or more hinged joints.

Ideally the hinged joints comprise first and second mutually engagable hinge portions.

Preferably, at the joint between each adjacent set of wall panels, the first mutually engagable hinge portion of a hinged joint is attachable to the side edge of a first wall panel and the second mutually engagable hinge portion of the hinge joint is attachable to the side edge of a second wall panel, the mutually engagable hinge portions being engagable to hingedly join said first and second wall panels.

Ideally, the first and second mutually engagable hinge portions comprise joining members which extend partially along the inner and outer faces of the wall panels.

Preferably, the joining members comprise a plurality of finger portions which extend partially along the outer faces of the wall panels, said finger portions being attachable to the wall panels by mechanical fixings, adhesively, or any other suitable method.

Preferably, the joining members comprise plate elements which extend partially along the inner faces of the wall panels.

Ideally, the finger portions and plate element are arranged in a spaced apart relationship such that they define a gap therebetween into which the wall panels may be slid.

Ideally, the first and second mutually engagable hinge portions comprise at least one rotatable connection member therebetween.

Preferably, the rotatable connection member comprises a shaft locatable on the first or second mutually engagable hinge portion and a shaft receiving cavity formed for receiving said shaft on the respective other mutually engagable hinge portion, such that the shaft may rotate within the shaft receiving cavity to permit relative rotation between the first and second mutually engagable hinge portions.

Ideally, each hinged joint comprises a plurality of rotatable connection members.

Preferably, the first movement restriction member comprises a first engagement feature locatable on the first or second mutually engagable hinge portion and second engagement feature locatable on the respective other mutually engagable hinge portion.

Ideally, the first engagement feature of the first movement restriction means is a male feature and the second engagement feature thereof is a female feature such that the male feature is selectably insertable into the female feature.

Preferably, the first and second mutually engagable hinge portions comprise a plurality of interlocking hinge elements.

Ideally, the interlocking hinge elements comprise a series of protrusions and recesses formed on the first and second mutually engagable hinge portions such that the protrusions of the first mutually engagable hinge portion are insertable into the recesses of the second mutually engagable hinge portion, and the protrusions of the second mutually engagable hinge portion are insertable into the recesses of the first mutually engagable hinge portion.

Preferably, the rotatable connection members are formed on one or more of the interlocking hinge elements.

Ideally, the male and female engagement features of the first movement restriction means are formed on respective opposing surfaces of one or more of the protrusions of the interlocking hinge elements such that, in use, the surfaces having said male and female engagement features oppose each other.

Preferably, the plane of rotation of the hinged joint is generally parallel to the plane of the opposing surfaces of the one or more of the protrusions of the interlocking hinge elements.

Ideally, the hinged joint is rotatable in a first direction, the first direction being a direction wherein the wall panels are rotated towards each other such that the refuse receptacle transitions towards the first configuration.

Preferably, the hinged joint is rotatable in a second direction, the second direction generally opposing the first direction, the second direction being a direction wherein the wall panels are rotated away from each other such that the refuse receptacle moves transitions towards the second configuration.

In use, rotation of the hinged joint in the first direction results in insertion of the male engagement feature of the first movement restriction means into the female engagement feature thereof and rotation of the hinged joint in the second direction results in removal of the said male engagement feature from said female engagement feature.

Preferably, the male and female engagement features of the first movement restriction means are locatable on opposing surfaces of the protrusions of the interlocking hinge elements such that when the refuse receptacle is in the first configuration said male engagement feature is inserted into the female engagement feature.

Preferably, the male and female engagement features of the first movement restriction means are locatable on opposing surfaces of the protrusions of the interlocking hinge elements such that rotation of the hinged joint so that the refuse receptacle is in the second configuration results in the male and female engagement features of the first movement restriction means being rotated in the same plane but in opposite directions, such that said male engagement feature is located approximately 180 degrees from the female engagement feature in the plane of rotation of the hinged joint.

Ideally, the female engagement feature of the first movement restriction means comprises two protruding formations defining a receiving recess therebetween.

Preferably, the male engagement feature of the first movement restriction means comprises a single protruding formation sized and dimensioned to be insertable into the receiving recess formed between the two protruding formations of the female engagement feature.

Preferably, the third movement restriction means is formed by the male engagement feature of the first movement restriction means in cooperation with an outer portion of one of the protruding formations of the female engagement feature thereof, the outer side of the female engagement feature being the side not defining the receiving recess.

Ideally, abutment of the male engagement feature of the first movement restriction means against the outer side of the female engagement feature thereof prevents the refuse receptacle collapsing back to the first configuration from the intermediate configuration.

Advantageously, the refuse receptacle may be opened from the first configuration to the intermediate configuration whereat it is held. The intermediate configuration is such that the refuse receptacle can be stood upright without support from a user and the upper opening is partially opened such that a user can more easily manipulate the wall panels to transition the refuse receptacle to the second configuration.

Preferably, the second movement restriction member comprises a first engagement feature locatable on the first or second mutually engagable hinge portion and second engagement feature locatable on the respective other mutually engagable hinge portion.

Ideally, the first engagement feature of the second movement restriction means is a male feature and the second engagement feature is a female feature such that the male feature is selectably insertable into the female feature.

Ideally, the male and female engagement features of the second movement restriction means are formed on respective opposing surfaces of one or more of the protrusions of the interlocking hinge elements such that, in use, the surfaces having the male and female engagement features oppose each other.

In use, rotation of the hinged joint in the second direction results in insertion of the male engagement feature of the second movement restriction means into the female engagement feature thereof and rotation of the hinged joint in the first direction results in removal of the said male engagement feature from the female engagement feature.

Preferably, the male and female engagement features of the second movement restriction means are locatable on opposing surfaces of the protrusions of the interlocking hinge elements such that when the refuse receptacle is in the second configuration said male engagement feature is inserted into the female engagement feature.

Preferably, the male and female engagement features of the second movement restriction means are locatable on opposing surfaces of the protrusions of the interlocking hinge elements such that rotation of the hinged joint so that the refuse receptacle is in the first configuration results in the male and female engagement features being rotated in the same plane but in opposite directions, such that the male engagement feature is located approximately 180 degrees from the female engagement feature.

Ideally, the female engagement feature of the second movement restriction means comprises two protruding formations defining a receiving recess therebetween.

Preferably, the male engagement feature of the second movement restriction means comprises a single protruding formation sized and dimensioned to be insertable into the receiving recess formed between the two protruding formations of the female engagement feature of the second movement restriction means.

Ideally, a resilient biasing means biases the male and/or female engagement features of the first and second movement restriction means towards the respective other engagement feature.

Preferably, the resilient biasing means biases the male and/or female engagement features of the first and second movement restriction means towards the respective other engagement feature when the male and female engagement features engage each other.

Ideally, the resilient biasing means biases the male engagement features of the first and second movement restriction means towards their respective female engagement features as the male engagement features engage with and travel over one of the protruding elements of the female engagement features into the receiving recesses thereof.

Preferably, the resilient biasing means biases the male engagement features of the first and second movement restriction means towards their respective female engagement features as the male engagement features engage with and travel over one of the protruding elements of the female engagement features and out of the receiving recesses thereof.

Preferably, the resilient biasing means results in a level of friction between the male and female engagement features such that a user must exert a predetermined level of force to rotate the hinged joint such that the male engagement feature is inserted into the female engagement feature, and similarly a user must exert a predetermined level of force to rotate the hinged joint such that the male engagement feature is removed from the female engagement feature.

Ideally, the protrusions of the first and second mutually engagable hinge portions, on which the male and female engagement features of the first and second movement restriction member are formed, comprise a slot formed therein between first and second sides thereof, the slot defining first and second protrusion portions.

Preferably, the first and/or second protrusion portions are deformable towards each other, said deformation being aided by the slot as the material of the first and second protrusion portions may deform into the space provided by the slot.

Ideally, the protrusions of the first and second mutually engagable hinge portions are elastically deformable such that, upon deformation of the first and/or second protrusion portions, said first and/or second protrusion portions return to their undeformed shape.

Advantageously, as the male and female engagement features of the first and second movement restriction member are formed on the first and/or second protrusion portions, the elastically deformable nature of the first and second protrusion portions permits temporary deformation which facilitates movement of the male and/or female engagement features away from each other in the axial direction of the hinged joint to an extent which permits insertion and removal of the male engagement features into the female engagement features. The deformation also acts to reduce wear on the male and female engagement features over time.

Ideally, when the male and female engagement features of the first movement restriction means are engaged such that the male engagement feature is inserted into the female engagement feature, the male and female engagement features of the second movement restriction means are rotated, in plane, such that they are approximately 180 degrees apart.

Ideally, each hinged joint comprises eight rotatable connection members, eight first movement restriction means, and eight second movement restriction means.

Preferably, a plurality of hinged joints can be combined to form the hinged joint arrangement.

Advantageously, any length of hinged joint arrangement can be formed by adding further hinged joints. Therefore, larger refuse receptacles can be formed if required.

Ideally, each pair of adjacent wall portions is joined by a hinged joint arrangement comprising four hinged joints.

Preferably, the refuse receptacle comprises an upper closure which is adapted to selectably close or cover the upper opening.

Ideally, the upper closure comprises a lid.

Preferably, the lid is connected to one of the plurality of wall portions by a lid hinged joint, the hinged joint being of the same type as described in relation to those which join adjacent wall panels.

Ideally, the lid hinged joint is formed by cutting the hinged joint in half.

Ideally, the plurality of wall panels extend generally parallel to and/or co-planar with each other in the first configuration.

Ideally, the hinged joints are injection moulded hinged joints.

According to a second aspect of the invention, there is provided a hinged joint for use in a refuse receptacle.

According to a third aspect of the invention there is provided a method of manufacturing a refuse receptacle comprising the steps of: providing a plurality of wall portions having top and bottom edges and two opposing side edges extending between their upper and lower edges such that each of the plurality of wall portions comprise generally quadrangular wall portions, joining each of the plurality of wall portions to adjacent wall portions about a movable joint means to form a refuse receptacle comprising a first configuration, being a generally planar storage configuration, and a second configuration, wherein the wall portions are positionable relative to each other to form a receptacle having a refuse accepting space defined by said plurality of wall portions.

BRIEF DESCRIPTION OF THE DRAWINGS

An embodiment of the invention is now described by way of example and with reference to the accompanying drawings in which.

DETAILED DESCRIPTION OF THE DRAWINGS

The present teaching will now be described with reference to an exemplary refuse receptacle. It will be understood that the exemplary refuse receptacle is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 1:
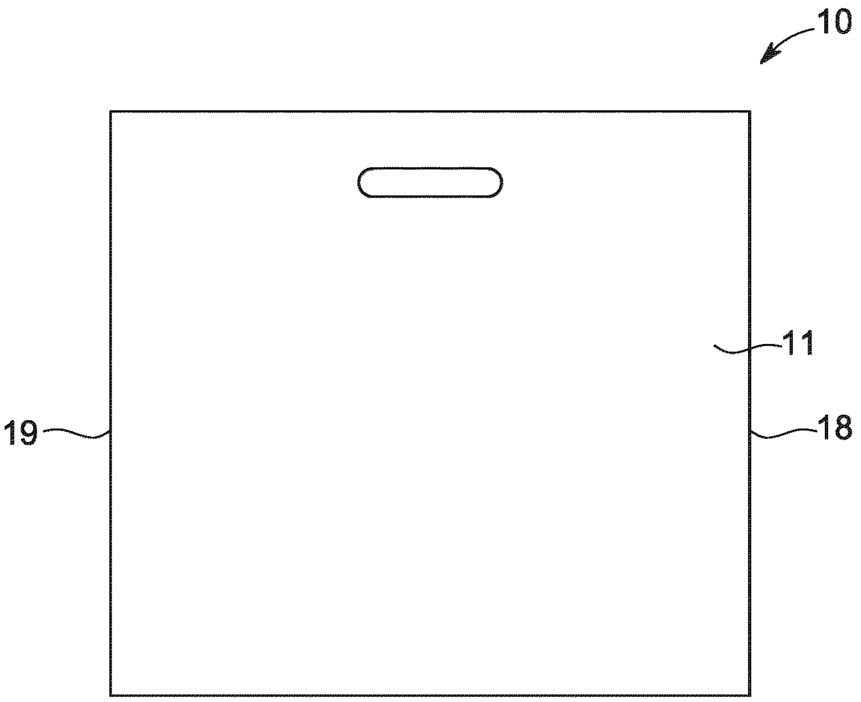
FIG. 1 is a conceptual front view of a refuse receptacle in a first configuration.
Figure 2:
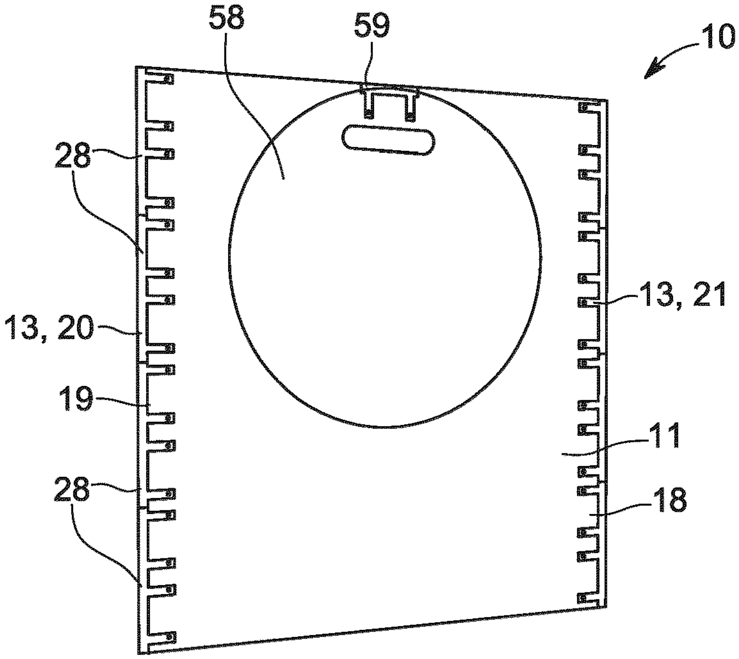
FIG. 2 is a perspective view of a refuse receptacle in a first configuration.

Referring now to the Figures there is illustrated a refuse receptacle 10 comprising a plurality of wall panels 11, 12 joined to each other about a plurality of hinged joint arrangements 13. The refuse receptacle 10 comprises a first configuration (as is best seen in FIGS. 1 and 2) being a generally planar storage configuration, and a second configuration, wherein the wall panels 11 are positionable relative to each other to form a receptacle having a refuse accepting space 14 defined by said plurality of wall panels 11. Advantageously, the refuse receptacle 10 can be quickly deployed for use from the first configuration to the second configuration, and returned to the first configuration for storage when use is complete. In the drawings, a preferred embodiment is shown wherein there are two wall panels 11, 12, joined by hinged joint arrangements 13 about their adjacent edges. However, it should be understood that any number of wall panels could be used and joined by hinged joint arrangements 13. For Example, four wall panels could be utilised, joined by hinged joint arrangements and used to form a square refuse receptacle in the second configuration. Each of the plurality of wall panels 11, 12 comprise top and bottom edges 15, 16, said top edges 15 together defining an upper opening 17 into the refuse accepting space 14 in the second configuration. Advantageously, in the second configuration, the upper opening 17 may be used to easily access refuse contained in the refuse receptacle 10 for collection, or to place refuse into the refuse receptacle 10. In the second configuration, the bottom edges of the wall panels 16 together define a lower opening into the refuse accepting space 14, said lower opening opposing the upper opening 17. Advantageously, in the second configuration, the lower opening permits the refuse receptacle 10 to be placed over refuse such that refuse may be placed on the ground and the receptacle 10 placed thereover.

Figure 3:
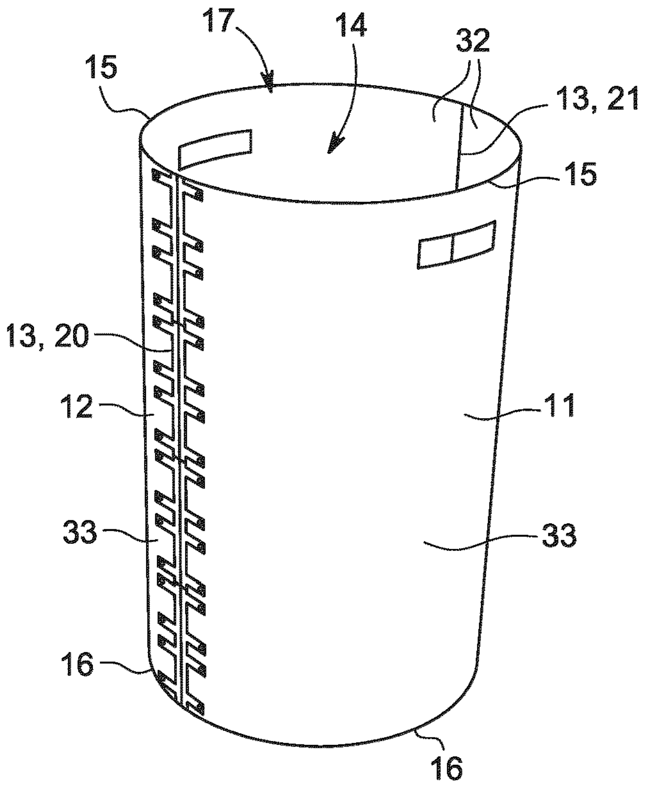
FIG. 3 is a perspective view of a refuse receptacle in a second configuration.
Figure 4:
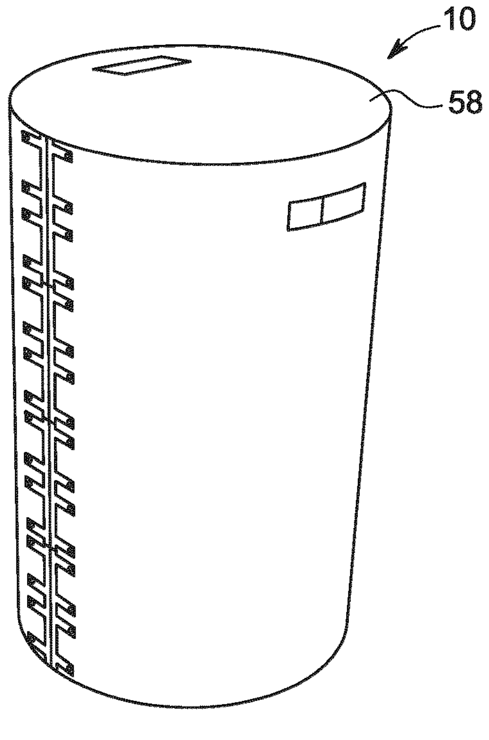
FIG. 4 is a perspective view of the refuse receptacle of FIG. 3 having a top closure.

Each of the wall panels 11, 12 comprise two opposing side edges 18, 19 extending between their upper and lower edges 15, 16 such that each of the wall panels 11, 12 comprise generally quadrangular wall panels 11, 12. The first wall panel 11 is joined to the second wall panel 12 by hinged joint arrangements 20, 21 locatable along their respective side edges 18, 19. The first and second wall panels 11, 12 are joined along their respective first side edges 18 by a first hinged joint arrangement 20, and joined along respective second side edges 19 by a second hinged joint arrangement 21. Advantageously, the two wall panels 11, 12 form a continuous outer wall of the refuse receptacle 10. The wall panels 11, 12 are elastically deformable such that each wall panel 11, 12 may bend to form a curvature in the second configuration and return to a flat/planar shape in the first configuration. In a preferred embodiment, the wall panels 11, 12 bend in the second configuration such that the refuse receptacle 10 forms a generally cylindrical shaped refuse receptacle 10 (as is best viewed in FIGS. 3 and 4).

The refuse receptacle 10 comprises a first movement restriction arrangement 22, 23, which encourages the wall panels 11, 12 to remain in the first configuration. The first movement restriction arrangement 22, 23 is adapted to retain the wall panels 11, 12 in the first configuration until application of a pre-determined level of force by a user urges the wall panels 11,12 out of the first configuration such that the wall panels 11, 12 move into an intermediate configuration between the first and second configurations. Advantageously, the refuse receptacle 10 is encouraged to stay in the first configuration until ready for use rather than deploying unintentionally to the second configuration. The refuse receptacle 10 comprises second movement restriction arrangement 24, 25 which encourages the wall panels 11, 12 to remain in the second configuration. The second movement restriction arrangement 24, 25 is adapted to retain the wall panels 11, 12 in the second configuration until application of a pre-determined level of force by a user urges the wall panels 11, 12 out of the second configuration such that the wall panels 11, 12 move into the intermediate configuration between the first and second configurations. Advantageously, the refuse receptacle 10 is encouraged to stay in the second configuration when in use rather than collapsing unintentionally to the first configuration. The refuse receptacle 10 also comprises a third movement restriction arrangement 26, 27 which acts to retain the refuse receptacle in the intermediate configuration. The first, second, and third movement restriction arrangements 22, 23, 24, 25, 26, 27, are locatable on the hinged joint arrangement 13.

The hinged joint arrangement 13 comprises one or more hinged joints 28. In the preferred embodiment, each hinged joint arrangement 13 comprises four hinged joints 28. However, it should be understood that any suitable number of hinged joints 28 could be utilised depending on the length of joint required. The hinged joints 28 comprise first and second mutually engagable hinge portions 29, 30. At the joints between the wall panels 11, 12, the first mutually engagable hinge portion 29 of is attached to the side edge of the first wall panel 11 and the second mutually engagable hinge portion 30 is attached to the side edge of the second wall panel 12, the mutually engagable hinge portions 29, 30 being engagable to hingedly join said first and second wall panels 11, 12. The first and second mutually engagable hinge portions 29, 30 comprise joining members 31, 34 which extend partially along the inner and outer faces 32, 33 of the wall panels 11, 12. The joining members 31, 34 comprise a plurality of finger portions 34 which extend partially along the outer faces 33 of the wall panels 11, 12, said finger portions 34 having a bore 35 formed therein through which mechanical fixings are inserted to attach the finger portions 34 to the wall panels 11, 12. The joining members 31, 34, further comprise a plate element 31, the plate element 31 extends partially along the inner surfaces 32 of the wall panels 11, 12. The finger portions 34 and plate element 31 are arranged in a spaced apart arrangement such that they define a gap 35 into which the wall panels 11, 12 may be slid. The finger portions 34 and plate element 31 essentially sandwich the wall panels 11, 12 therebetween.

Figure 6A:
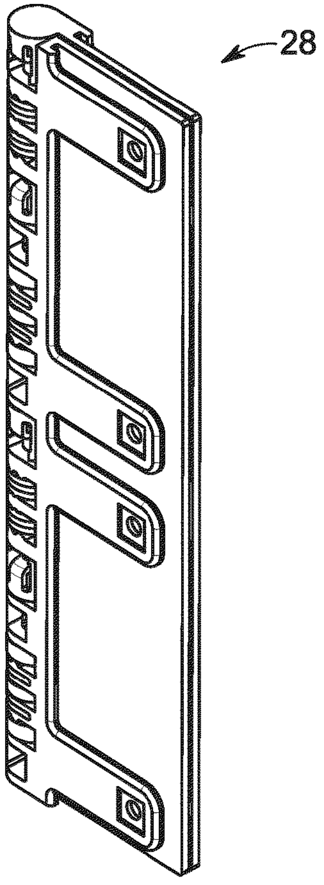
FIG. 6*a* is a perspective view of a hinged joint of a refuse receptacle in a first configuration.
Figure 6B:
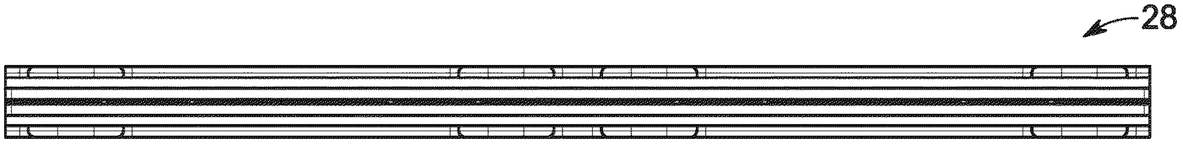
FIG. 6*b* is a side view of the hinged joint of FIG. 6*a* in a first configuration.
Figure 6C:
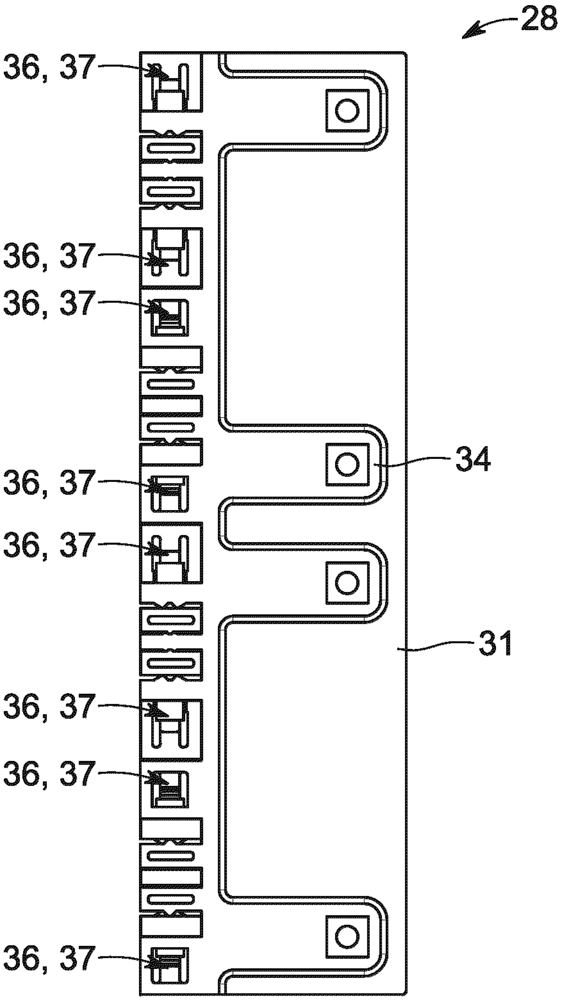
FIG. 6*c* is a front view of the hinged joint of FIG. 6*a* in a first configuration.
Figure 6D:
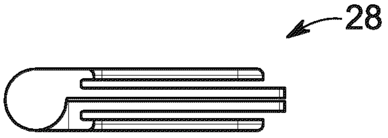
FIG. 6*d* is a top view of the hinged joint of FIG. 6*a* in a first configuration.

The first and second mutually engagable hinge portions 29, 30 comprise at least one rotatable connection member 36, 37 therebetween. In the preferred embodiment, as is best shown in FIG. 6*c*, the first and second mutually engagable hinge portions 29, 30 comprise eight rotatable connection members 36, 37 therebetween. The rotatable connection members 36, 37 comprise a shaft 36 locatable on the first or second mutually engagable hinge portion 29, 30 and a corresponding shaft receiving cavity 37 formed for receiving said shaft 36 on the respective other mutually engagable hinge portion 29, 30, such that the shaft 36 may rotate within the cavity 37 to permit relative rotation between the first and second mutually engagable hinge portions 29, 30. The rotatable connection members 36, 37 in preferable embodiments form barrel type hinges 36, 37. The cavity 37 may comprise a clip element which is sized and dimensioned to receive the shaft and retain the shaft 36 once received. This clip may take any form as would under stood by the skilled person, however in the embodiments of the drawings, the clip comprises an elastically deformable retaining tab 68 which is deformable to permit passage of the shaft 36 into the cavity 37, and returns to its pre-deformed shape to act as a barrier for the shaft such that it can not be removed from the cavity 37 without manipulation of the retaining tab 68. So by fully engaging the shaft 36 and cavity 37 the shaft 36 can not become disengaged from the cavity 37. Once the hinged arrangement 13 is even partially opened the mutually engagable hinge portions 29, 30 may not be separated even if the shaft and cavity were not present. In terms of locking, these components are only required to lock the two mutually engagable hinge portions 29, 30 together when the receptacle 10 is in the first storage configuration.

Figure 5A:
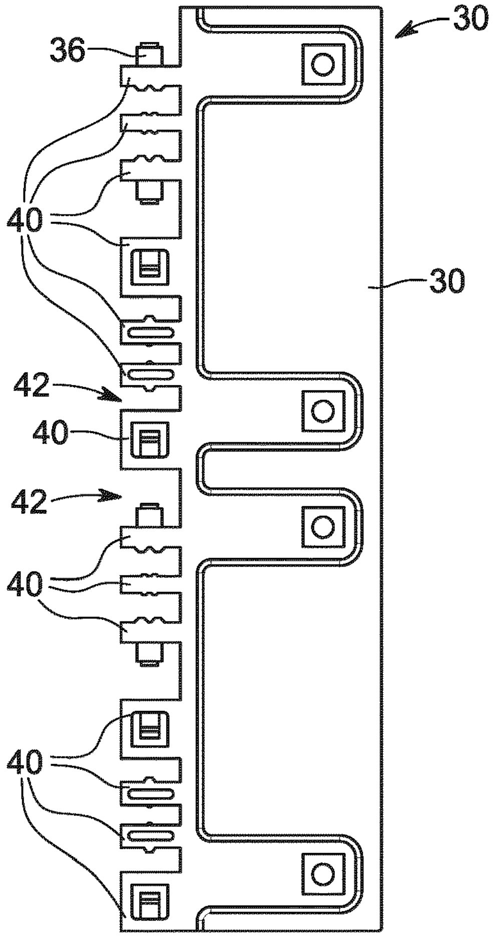
FIG. 5*a* is a front view of a mutually engagable hinge portion of a hinged joint of a refuse receptacle.
Figure 5B:
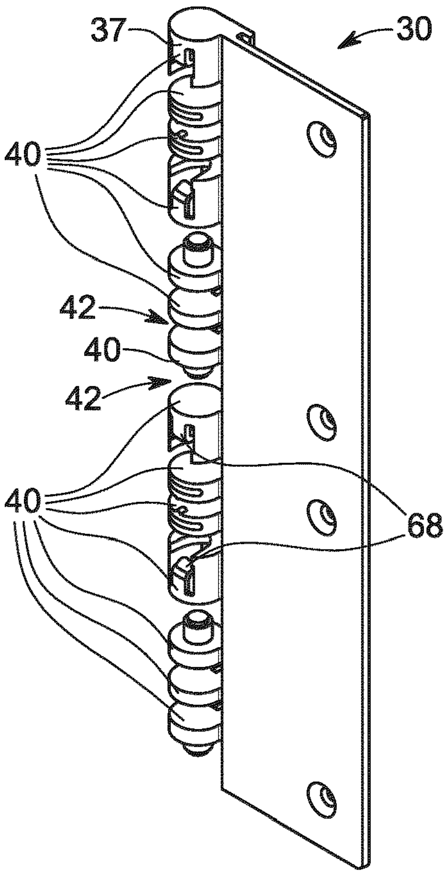
FIG. 5*b* is a perspective view of the mutually engagable hinge portion of FIG. 5*a;*
Figure 5C:
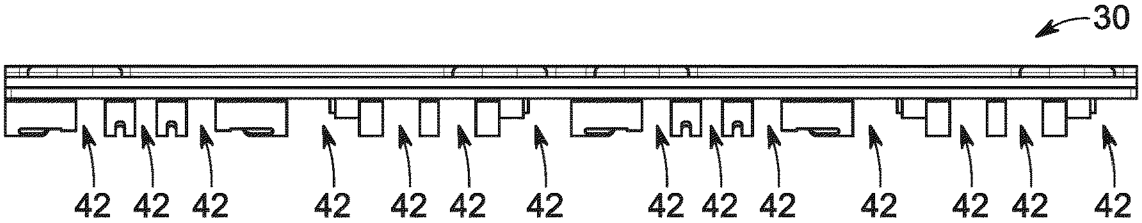
FIG. 5*c* is a side view of the mutually engagable hinge portion of FIG. 5*a;*
Figure 5D:
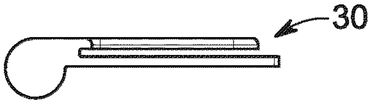
FIG. 5*d* is a top view of the mutually engagable hinge portion of FIG. 5*a;*
Figure 7A:
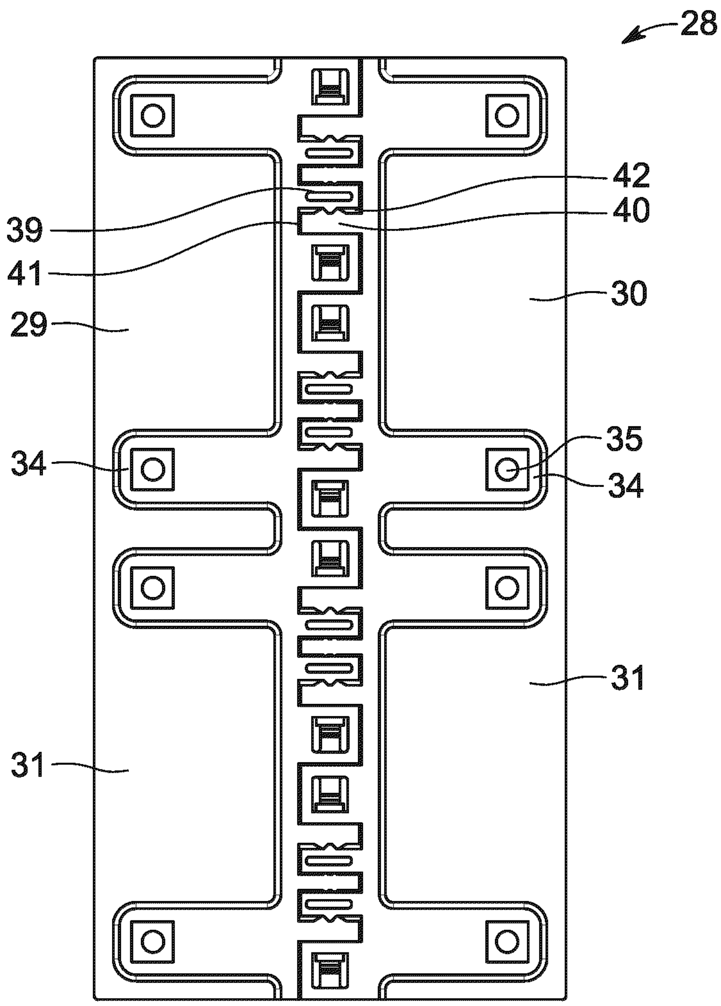
FIG. 7*a* is a front view of the hinged joint of FIG. 6*a* in a second configuration.
Figure 7B:
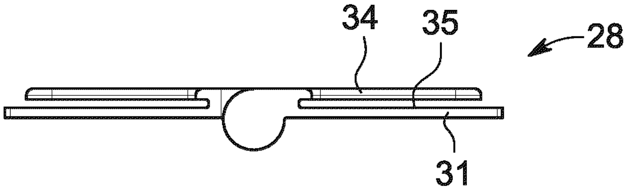
FIG. 7*b* is a top view of the hinged joint of FIG. 7*a;*
Figure 7C:
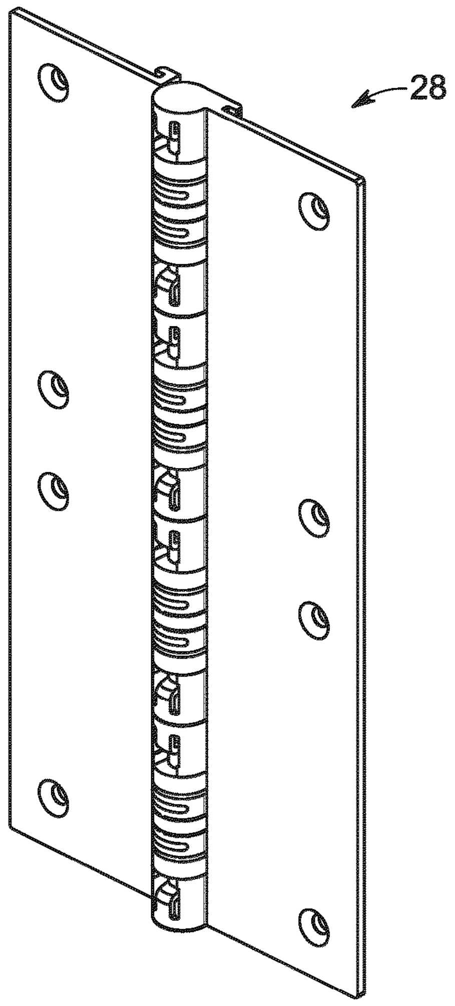
FIG. 7*c* is a rear perspective view of the hinged joint of FIG. 7*a;*
Figure 7D:
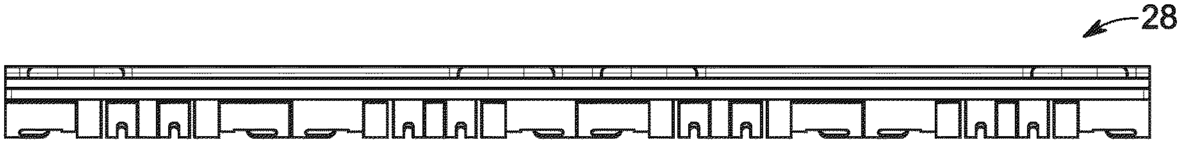
FIG. 7*d* is a side view of the hinged joint of FIG. 7*a;*
Figure 8:
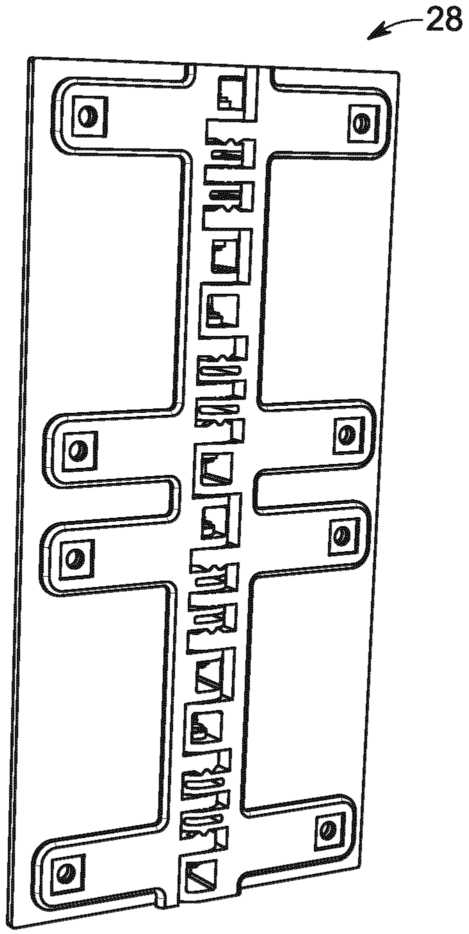
FIG. 8 is a front perspective view of a hinged joint for a refuse receptacle.
Figure 9:
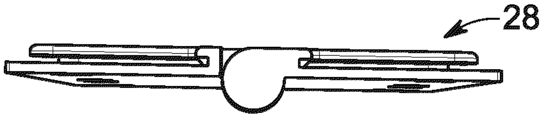
FIG. 9 is a top perspective view of the hinged joint of FIG. 8.
Figure 10:
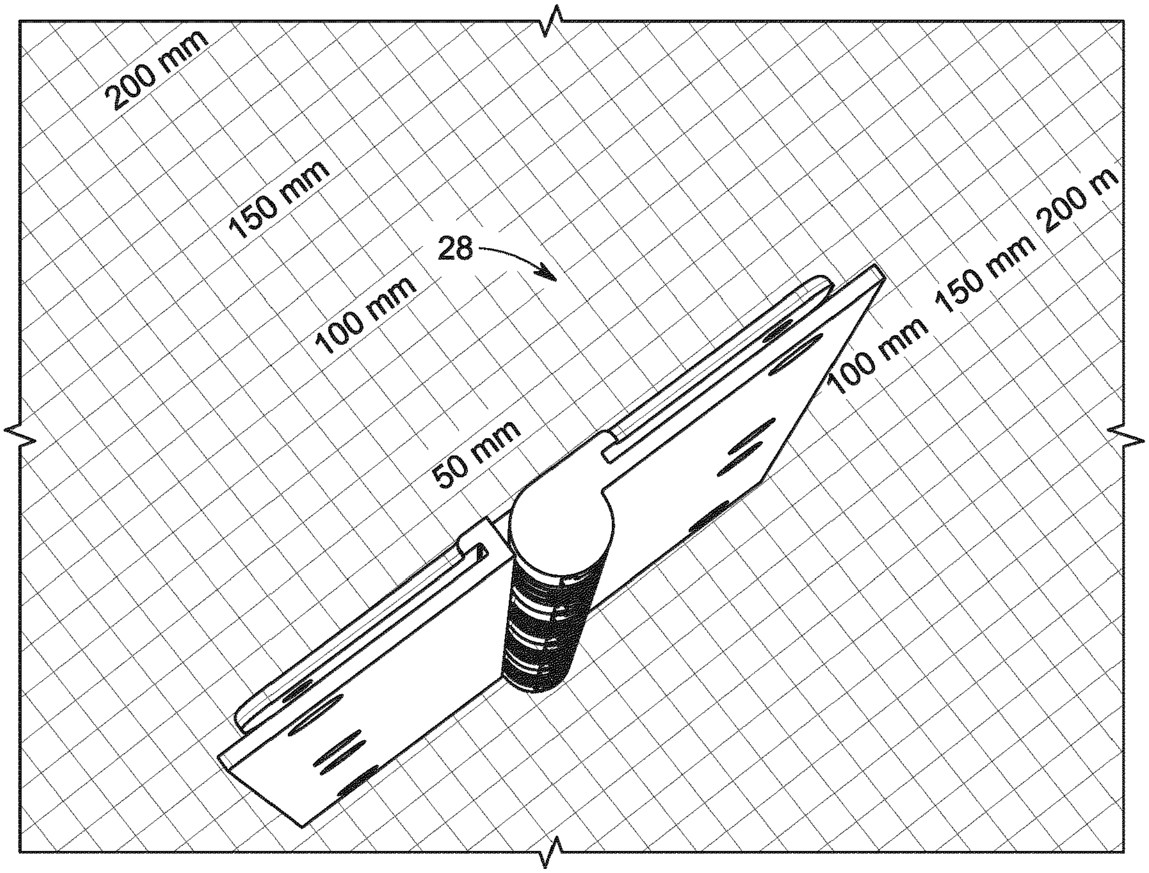
FIG. 10 is a top rear perspective view of the hinged joint of FIG. 8.
Figure 11:
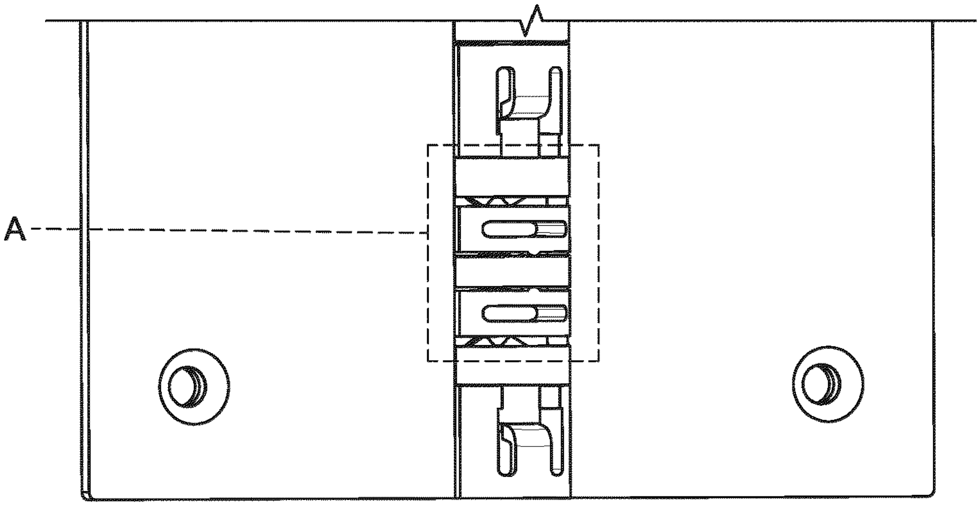
FIG. 11 is a detail rear perspective view of the hinged joint of FIG. 8.

Preferably, the first and second mutually engagable hinge portions 29, 30 comprise a plurality of interlocking hinge elements 39, 40, 41, 42. As is best viewed in FIGS. 5*a* to 5*c*, the interlocking hinge elements 39, 40, 41, 42 comprise a series of protrusions 39, 41 and recesses 40, 42 formed on the first and second mutually engagable hinge portions 29, 30 such that the protrusions 39 of the first mutually engagable hinge portion 29 are insertable into the recesses 42 of the second mutually engagable hinge portion 30. Likewise, the protrusions 40 of the second mutually engagable hinge portion 30 are insertable into the recesses 41 of the first mutually engagable hinge portion 29. FIGS. 5*a* to 5*c* illustrate this in relation to the second mutually engageable hinge portion 30, however it can be further seen from FIG. 7*a* how the second mutually engageable hinge portion 30 comprises a complimentary series of protrusions 39, 40 and recesses 41, 42 which interlock to form a hinged joint 28. In this manner the hinged joint 28 may form a piano type hinge arrangement 28. The recesses 41, 42, are formed by the gaps between the protrusions 39, 40. Each protrusions 39, 40, may be formed to comprise one or more of the movement restriction members 22, 23, 24, 25, 26, 27, and/or or be formed to comprise the shaft 36 or shaft receiving cavity 37 of a rotatable connection member 36, 37. In this manner, the protrusions 39, 40 are not all of the same size and/or dimension, said size and/or dimension depending on the functional elements of the movement restriction members 22, 23, 24, 25, 26, 27 and/or rotatable connection members 36, 37 which will be formed on the protrusions 39, 40. However, the arrangement of the different protrusions 39, 40 of each mutually engageable hinge portion 29, 30 are complimentary such that, when the hinged joint 28 is assembled, the protrusions 39, 40 of each mutually engageable hinge portion 29, 30 align with a suitable sized and dimensioned recess 41, 42 of the opposing mutually engageable hinge portion 29, 30.

The rotatable connection members 36, 37 are formed on one or more of the protrusions 39, 40. As can be seen in FIG. 5*a*, four of the protrusions 40 of the second mutually engageable hinge portion 30 comprise a shaft 36 of the rotatable connection member. Four of the protrusions 40 of the second mutually engageable hinge portion 30 comprise a shaft receiving cavity 37 of the rotatable connection member 36, 37. When the hinged joint 28 is assembled, the four protrusions 40 of the second mutually engageable hinge portion 30 having the shafts 36 of the rotatable connection member will align with and oppose corresponding protrusions 39 of the first mutually engageable hinge portion 29 which have a shaft receiving cavity 37 of the rotatable connection member such that these portions 36, 37 may be engaged to provide rotatable connections in the assembled hinged joint 28. Likewise, when the hinged joint 28 is assembled, the four of the protrusions 40 of the second mutually engageable hinge portion 30 having the shaft receiving cavities 37 of the rotatable connection member will align with and oppose corresponding protrusions 39 of the first mutually engageable hinge portion 29 which have a shaft 36 of the rotatable connection member such that these portions 36, 37 may also be engaged to provide rotatable connections in the assembled hinged joint 28.

Figure 13:
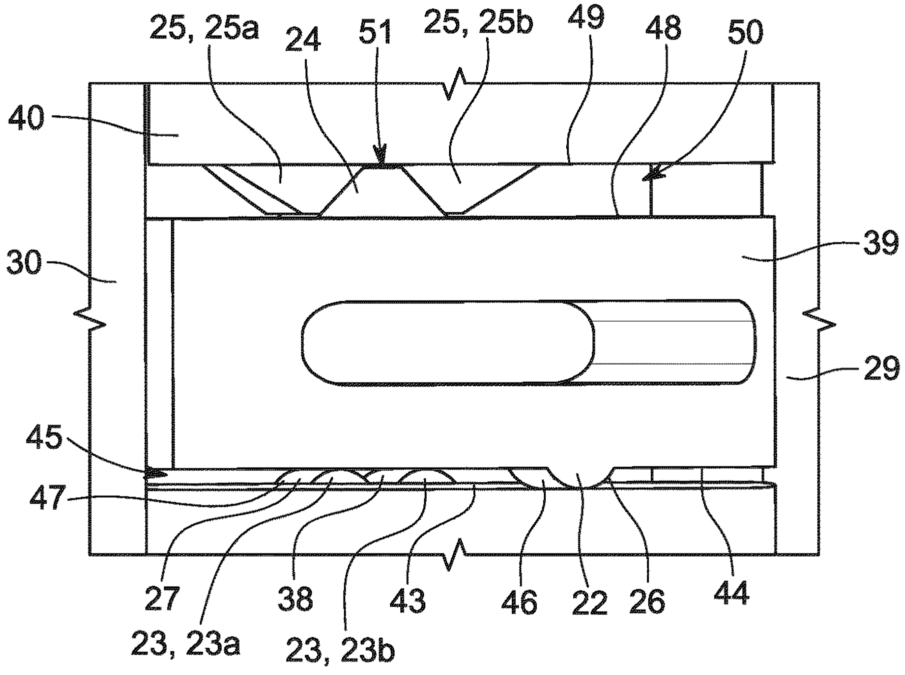
FIG. 13 is a detail view of portion B of FIG. 12.
Figure 14:
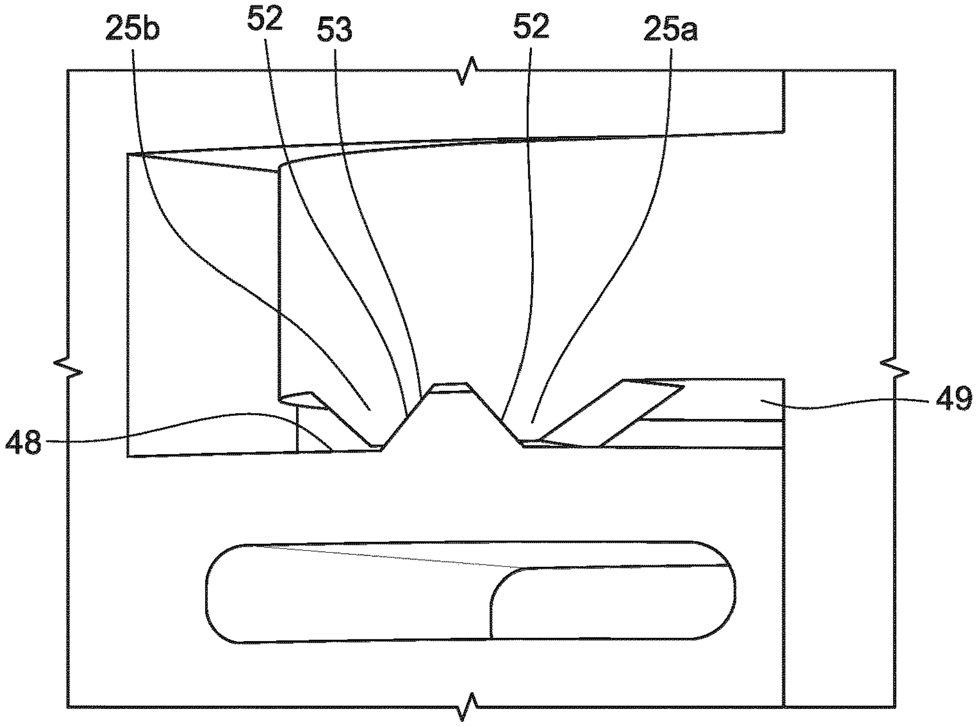
FIG. 14 is a perspective view of a second movement restriction member of the hinged joint of FIG. 8.

As is best viewed in FIG. 13, the first movement restriction member 22, 23 comprises a first engagement feature 22 locatable on the first mutually engagable hinge portion 29 and second engagement feature 23 locatable on the second mutually engagable hinge portion 30. The first engagement feature 22 is a male feature 22 and the second engagement feature 23 thereof is a female feature 23 such that the male feature 22 is selectably insertable into the female feature 23. As can be seen in FIG. 13, the female feature 23 is formed by two rounded projections 23*a*, 23*b* which define a space 38 therebetween. The male feature 22 is formed by a rounded projection 22 similar to those 23*a*, 23*b* which forms the female feature 23, and is sized and dimensioned to be received in the space 38 between the two rounded projections 23*a*, 23*b* of the female feature 23.

As can be seen in FIG. 13. The male and female engagement features 22, 23 of the first movement restriction member 22, 23 are formed on respective opposing surfaces 43, 44 of one or more of the protrusions 39, 40 of the mutually engageable hinge portions 29, 30 such that, in use when the hinged joint 28 is assembled, the surfaces 43, 44 having said male and female engagement features 22, 23 oppose each other. The opposing surfaces 43, 44 are the surfaces of the one or more protrusions 39, 40 which extend, in use, generally perpendicular to the axial direction of hinged joint 28. The plane of rotation of the hinged joint 28 is generally parallel to the plane of the opposing surfaces 43, 44 of the one or more of the protrusions 39, 40 of the mutually engageable hinge portions 29, 30. In addition, the opposing surfaces 43, 44, extend parallel to each other in a spaced apart relationship when the hinged joint 28 is assembled for use. The spacing 45 between the opposing surfaces 43, 44, is approximately equal to the height of the rounded projections 22, 23*a*, 23*b* which form the male and female engagement features 22, 23 of the first movement restriction member. Advantageously, the rounded projections 22, 23*a*, 23*b* may rotate in the space 45 between opposing surfaces 43, 44, as the opposing surfaces rotate when the hinged joint 28 is rotated. The rounded protrusions 22, 23*a*, 23*b* of the male and female engagement features 22, 23 of the first movement restriction member are locatable on the opposing surfaces 43, 44 of the protrusions such that when the refuse receptacle 10 is in the first configuration, the rounded projection 22 forming the male engagement feature 22 is inserted into the space 38 formed between the rounded projections 23*a*, 23*b* of the female engagement feature 23. In use, rotation of the hinged joint 28 in a first direction results in insertion of the male engagement feature 22 of the first movement restriction member into the space 38 formed by the rounded projections 23*a*, 23*b* of the female engagement feature 23 thereof. Rotation of the hinged joint 28 in the first direction is rotation in a direction which places the refuse receptacle 10 in the first configuration. As such, rotation in the first direction causes the wall panels 11, 12 of the refuse receptacle 10 to collapse to a generally flat planar configuration, and as the refuse receptacle 10 approaches this generally flat planar configuration, the rotation in the first direction also causes insertion of the male engagement feature 22 of the first movement restriction member into the space 38 formed between the rounded projections 23*a*, 23*b* of the female engagement feature 23 thereof. Advantageously, once the male engagement feature 22 is in this position, the first movement restriction member 22, 23 acts as a stop to prevent the refuse receptacle 10 unintentionally moving out of the first configuration. In order to move out of the first configuration, a user would need to apply enough force to separate the wall panels 11, 12, thus rotating said wall panels 11, 12 to cause rotation in the hinged joint 28 in a second direction opposing the first direction. The force applied would need to be sufficient to urge the male engagement feature 22 from the space 38 between the rounded projections 23*a*, 23*b* of the female engagement feature, over one of said projections 23*a* such that the panels 11, 12 are then free to further rotate towards the second configuration. Thus the first movement restriction member 22, 23 acts as a locking element to releasably retain the refuse receptacle in the first configuration until deployment to the second configuration is required. Rotation of the hinged joint 28 in the second direction opposing the first direction results in removal of the said male engagement feature 22 from the space 38 formed by the rounded projections 23*a*, 23*b* of the female engagement feature 23 when enough force is applied by a user to initiate this rotation in the second direction.

Figure 15:
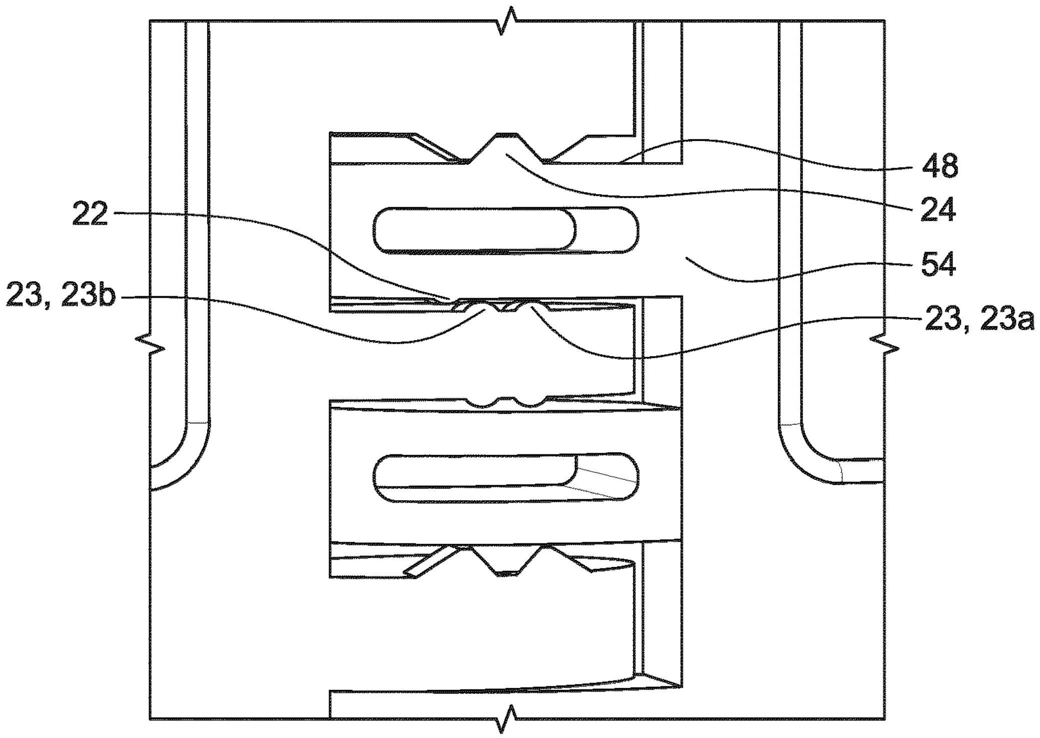
FIG. 15 is a perspective view of two second movement restriction members and one first movement restriction member of the hinged joint of FIG. 8.
Figure 16:
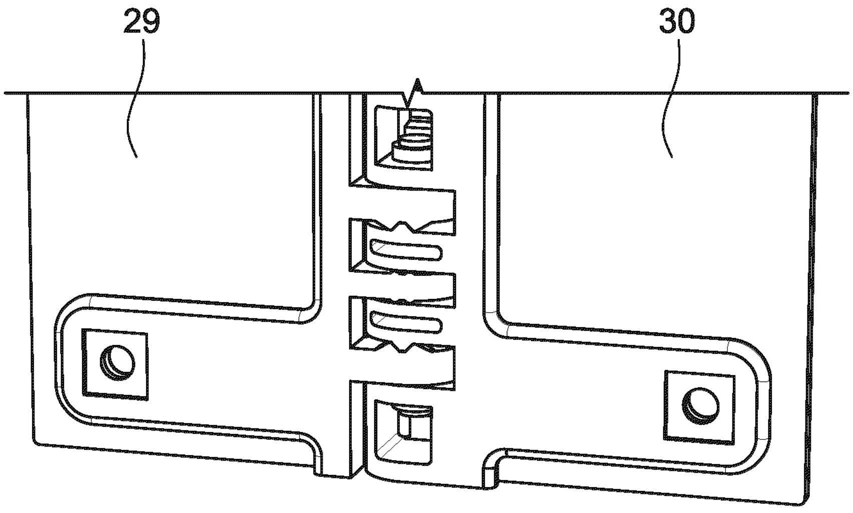
FIG. 16 is a detail perspective view of a lower portion of the hinged joint of FIG. 8.
Figure 17:
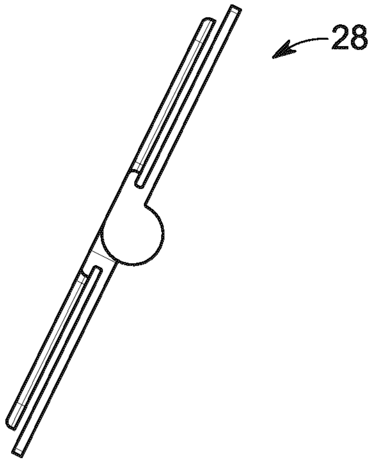
FIG. 17 is a top view of the hinged joint of FIG. 8.

The male and female engagement features 22, 23 of the first movement restriction member are locatable on opposing surfaces 43, 44 of the protrusions of the interlocking hinge elements such that rotation of the hinged joint 28 so that the refuse receptacle is in the second configuration results in the male and female engagement features 22, 23 of the first movement restriction member being rotated in the same plane of rotation, but in opposite directions. Resultantly, in the first configuration the male engagement feature 22 is located such that it opposes the female engagement feature 23 and in the second configuration, the male and female engagement features 22, 23 are rotated such that said male engagement feature 22 is located approximately 180 degrees from the female engagement feature 23 in the plane of rotation. This can be seen in FIGS. 12, 13, and 15, which show the hinged joint 28 rotated such that the refuse receptacle 10 is in the second configuration. The complementary rounded surfaces 46, 47 of the rounded protrusions 22, 23*a* results in the rounded protrusion 22 of the male engagement feature more easily able to pass over one of the rounded protrusions 23*a* of the female engagement portion 23 and into the space 38 formed between the rounded protrusions 23*a*, 23*b* of the female engagement portion 23. This also acts to reduce wear on the rounded protrusions 22, 23*a*, 23*b* of the first movement restriction member 22, 23.

The third movement restriction member 26, 27 is formed by an outer surface 26 of the male engagement feature 22 of the first movement restriction member 22 in cooperation with an outer surface 27 of one of the protruding formations 23*a* of the female engagement feature 23. The outer surface of the protrusion 23*a* of the female engagement feature being the side not defining the space 38. Abutment of the outer surface 26 of the male engagement feature 22 of the first movement restriction member 22, 23 against the outer surface one of the protruding formations 23*a* of the female engagement feature 23 prevents the refuse receptacle 10 collapsing back to the first configuration from the intermediate configuration. More specifically, this abutment prevents the male engagement feature 22 of the first movement restriction member 22, 23 moving into the space 38 between the rounded protrusions 23*a*, 23*b* of the female engagement feature unless a pre-determined level of force is applied by a user. Advantageously, the refuse receptacle 10 may be opened from the first configuration to the intermediate configuration whereat it is held. The intermediate configuration places the wall panels 11, 12 in a position relative to each other such that the refuse receptacle 10 can be stood upright without support from a user. In the intermediate configuration, the upper opening 17 is partially opened such that a user can more easily transition the refuse receptacle to the second configuration by pressing inwards at or about the hinged joint arrangements 13, forcing the refuse receptacle 10 into a generally cylindrical form.

The second movement restriction member 24, 25 is similar in some aspects of structure to the first movement restriction member 22, 23. As can be seen in FIG. 13, the second movement restriction member 24, 25 comprises a first engagement feature 24 locatable on the first or second mutually engagable hinge portion 29, 30 and second engagement feature 25 locatable on the respective other mutually engagable hinge portion 29, 30. The first engagement feature 24 of the second movement restriction member 24, 25 is a male feature 24 and the second engagement feature 25 is a female feature such that the male feature 24 is selectably insertable into the female feature 25. The male and female engagement features 24, 25 of the second movement restriction member are formed on respective opposing surfaces 48, 49 of one or more of the protrusions 39, 40 of the interlocking hinge elements 29, 30 such that, in use, the surfaces 48, 49 having the male and female engagement features 24, 25 oppose each other. The opposing surfaces 48, 49 are the surfaces of the one or more protrusions 39, 40 which extend, in use, generally perpendicular to the axial direction of hinged joint 28. The plane of rotation of the hinged joint 28 is generally parallel to the plane of the opposing surfaces 48, 49 of the one or more of the protrusions 39, 40 of the mutually engageable hinge portions 29, 30. In addition, the opposing surfaces 48, 49, extend parallel to each other in a spaced apart relationship when the hinged joint 28 is assembled for use. The male and female engagement features 24, 25 of the second movement restriction member 24, 25 comprise generally trapezoidal features 24, 25*a*, 25*b* defining a height between the two parallel sides of said trapezoidal features 24, 25*a*, 25*b*. The spacing 50 between the opposing surfaces 48, 49, is approximately equal to the height of the trapezoidal features 24, 25*a*, 25*b* which form the male and female engagement features 24, 25 of the first movement restriction member. As can be seen in FIG. 13, the female engagement feature 25 is formed by two trapezoidal features 25*a*, 25*b* which define a space 51 therebetween. The male engagement feature 24 is formed by a single trapezoidal feature 24 similar to those which form the female engagement feature 25*a*, 25*b*, and is sized and dimensioned to be received into the space 51 between the two trapezoidal features 25*a*, 25*b* of the female engagement feature 25. In use, rotation of the hinged joint 28 in the second direction results in insertion of the male engagement feature 24 of the second movement restriction member 24, 25 into the space 51 defined by the two trapezoidal features 25*a*, 25*b* of the female engagement feature 25. Rotation of the hinged joint 28 in the first direction results in removal of the said male engagement feature 24 from said space 51 of the female engagement feature 25. The first and second directions refer to those as defined above in relation to first movement restriction member 22, 23. Therefore, insertion of the male engagement features 22, 24 of the first and second movement restriction members 22, 23, 24, 25 into the respective spaces 38, 51 defined by the female engagement features 23, 25 thereof occurs in opposing directions of rotation. Rotation of the hinged joint 28 in the second direction is rotation in a direction which places the refuse receptacle 10 in the second configuration. As such, rotation in the second direction causes the wall panels 11, 12 of the refuse receptacle 10 to form a generally cylindrical refuse receptacle 10 defining a refuse accepting space 14. As the refuse receptacle 10 approaches this second configuration, the rotation in the second direction also causes insertion of the male engagement feature 24 of the second movement restriction member into the space 51 formed by the trapezoidal features 25*a*, 25*b* of the female engagement feature 25 thereof. Advantageously, once the male engagement feature 24 is in this position, the second movement restriction member 24, 25 acts as a stop to prevent the refuse receptacle 10 unintentionally moving out of the second configuration and collapsing towards the first configuration. In order to move out of the second configuration, a user would need to apply enough force to the wall panels 11, 12 to force the wall panels 11, 12 towards each other and thus force inwards rotation of the wall panels 11, 12 about the hinged joint 28. Thus rotating said wall panels 11, 12 to cause rotation in the hinged joint 28 in the first direction. The force applied would need to be sufficient to urge the male engagement feature 24 from the space 51 between the trapezoidal features 25*a*, 25*b* of the female engagement feature 25, over one of said trapezoidal features 25*b* such that the panels 11, 12 are then free to further rotate towards the first configuration. Thus the second movement restriction member 24, 25 acts as a locking element to releasably retain the refuse receptacle in the second configuration for use until collapse to the first configuration is required for storage. The male and female engagement features 24, 25 of the second movement restriction member are locatable on opposing surfaces 48, 49 of the protrusions of the interlocking hinge elements such that rotation of the hinged joint 28 in order that the refuse receptacle is in the first configuration results in the male and female engagement features 24, 25 of the first movement restriction member being rotated in the same plane of rotation, but in opposite directions.

Resultantly, in the second configuration the male engagement feature 24 is located such that it opposes the female engagement feature 25 and in the second configuration, the male and female engagement features 24, 25 are rotated such that said male engagement feature 24 is located approximately 180 degrees from the female engagement feature 25 in the plane of rotation. This can be seen in FIGS. 12, 13, and 15, which show the hinged joint 28 rotated such that the refuse receptacle 10 is in the second configuration. The complementary sloped surfaces 52, 53 of the trapezoidal features 24, 25 results in the trapezoidal feature 24 of the male engagement feature 24 more easily able to pass over one of the trapezoidal features 25*b* of the female engagement feature 25 and into the space 51 formed between the trapezoidal features 25*a*, 25*b* of the female engagement portion 25.

Figure 12:
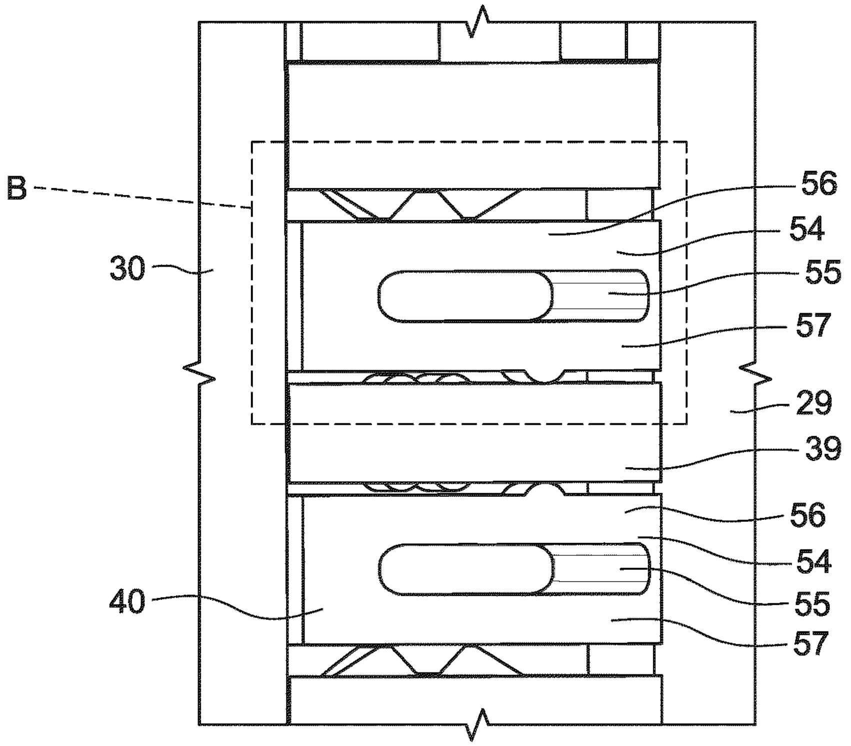
FIG. 12 is a detail view of portion A of FIG. 11.

As can be seen in FIGS. 12 and 13, with the hinged joint 28 assembled for use, when the male and female engagement features 22, 23 of the first movement restriction members are engaged such that the male engagement feature 22 is inserted into the female engagement feature 23 thereof, the male and female engagement features 24, 25 of the second movement restriction members are rotated, in the plane of rotation of the hinged joint 28, such that they are approximately 180 degrees apart. Similarly, with the hinged joint 28 assembled for use, when the male and female engagement features 24, 25 of the second movement restriction members are engaged such that the male engagement feature 24 is inserted into the female engagement feature 25 thereof, the male and female engagement features 22, 23 of the first movement restriction members are rotated, in the plane of rotation of the hinged joint 28, such that they are approximately 180 degrees apart.

One or more of the projections 39,40 of the first and second mutually engagable hinge portions 29, 30 form resilient biasing elements 54 which result in a biasing force being applied to the male engagement features 22, 24 of the first and second movement restriction members such that should the male engagement features 24 be moved from a neutral position away from their respective female engagement features 23, 25 in the axial direction of the hinged joint 28, said male engagement features 22, 24 are urged back towards said neutral position. As can be seen in FIG. 12, the resilient biasing elements are formed by providing a slotted throughbore 55 in one or more of the projections 39,40 of the first and second mutually engagable hinge portions 29, 30. The slotted throughbore 55 defines upper and lower protrusion portions 56, 57. The upper and lower protrusion portions 56, 57 are deformable towards each other, said deformation being aided by the slotted throughbore 55 as the material of the upper and lower protrusion portions 56, 57 may deform into the slotted throughbore 55. The resilient biasing elements 54 are elastically deformable such that, upon deformation of the upper and/or lower protrusion portions 56, 57, said portions 56, 57 are urged to return to their undeformed shape. Advantageously, as the male engagement features 22, 24 of the first and second movement restriction members are formed on the upper or lower protrusion portions 56, 57, the elastically deformable nature of the upper and lower protrusion portions 56, 57 permits temporary deformation which facilitates movement of the male engagement features 22, 24 away from their respective female engagement features 23, 25 in the axial direction of the hinged joint 28 to an extent which permits insertion and removal of the male engagement features 22, 24 into the respective spaces 38, 51 of their respective female engagement features 23, 25. The deformation also acts to reduce wear on the male and female engagement features 22, 23, 24, 25 over time which is important as refuse receptacles such as that described herein must be robust enough to endure many years of daily use. Additionally, the resilient biasing elements 54 result in a level of friction/resistance between the respective male and female engagement features 22, 23, 24, 25 such that a user must exert a predetermined level of force to rotate the hinged joint 28 such that a male engagement feature 22, 24 is inserted into a respective female engagement feature 23, 25, and similarly a user must exert a predetermined level of force to rotate the hinged joint 28 such that a male engagement feature 22, 24 is removed from a respective female engagement feature 23, 25. It should be understood that the skilled person may equally locate the female engagement features 23, 25 on the resilient biasing elements 54, or locate both the male and female engagement features 22, 23, 24, 25 on resilient biasing elements 54. As can be seen, for example, in FIGS. 12 and 15, each resilient biasing element 54 comprises a male engagement feature 24 of a second movement restriction element on an upper surface 48, and a male engagement feature 22 of a first movement restriction element on a lower surface 44 thereof. As such the resilient biasing element 54 may act to bias the male engagement features 22, 24 of both the first and second movement restriction members 22, 23, 24, 25. In the embodiment of the drawings, each hinged joint 28 comprises eight resilient biasing elements 54.

Figure 18:
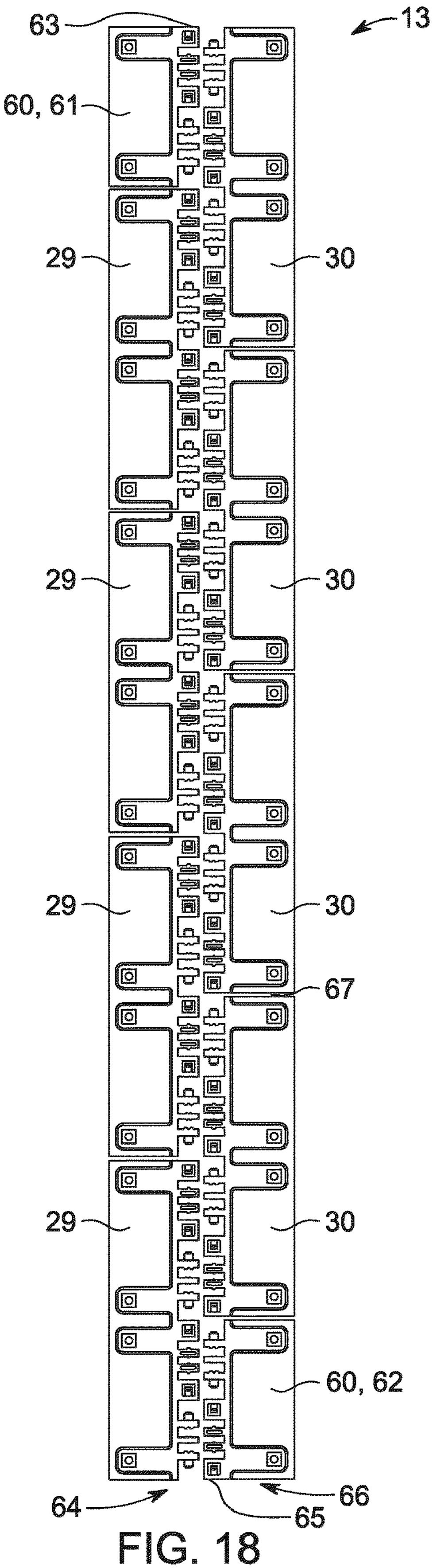
FIG. 18 is a front view showing a hinged joint arrangement comprising an overlapping/staggered arrangement of hinged joints.

In the preferred embodiment, as shown in the drawings, each hinged joint comprises eight rotatable connection members 36, 37, eight first movement restriction members 22, 23, and eight second movement restriction members 24, 25. However it should be understood that any suitable combination of these elements may be utilised without departing from the scope of the invention. A plurality of hinged joints 28 can be combined to form the hinged joint arrangement 13. Advantageously, any length of hinged joint arrangement 13 can be formed by adding further hinged joints 28. Therefore, larger refuse receptacles can be formed if required. In the preferred embodiment, each pair of adjacent wall portions 11, 12 is joined by a hinged joint arrangement 13 comprising at least four hinged joints 28. In the preferred embodiment, as can be seen best in FIG. 18, the sequence in which the hinged joints 28 are assembled is very important. If the hinged joint arrangement 13 is assembled simply with 4 hinged joints 28 forming each side of the hinged joint arrangement, the intersections 67 between hinged joints 28 would align on said each side, thus resulting in three weak points on either side. The weak points are at the three intersections 67 of the 4 hinged joints on each side of the hinged joint arrangement. At such a weak point, the only strength comes from the wall panels. This gives rise to the potential for the receptacle, when in the first storage configuration, to bend easily at these aligned points of intersection 67 or weak points. To address this issue a single hinged joint 28 is cut in half forming a half hinge 60 comprising first and second half height mutually engagable hinge portions 61, 62. The first half height mutually engagable hinge portion 61 is located at a first longitudinal end 63 of the hinged joint arrangement 13 and on a first side 64 of the hinged joint arrangement 13. The remainder of the first side 64 of the hinged joint arrangement 13 comprised four full height first mutually engagable hinge portions 29 which extend from the first half height mutually engagable hinge portion 61 to the second end 65 of the hinged joint arrangement 13. The second half height mutually engagable hinge portion 62 is located at a second longitudinal end 65 of the hinged joint arrangement 13 and on a second side 66 of the hinged joint arrangement. The remainder of the second side 66 of the hinged joint arrangement 13 comprised four full height second mutually engagable hinge portions 30 which extend from the second half height mutually engagable hinge portion 62 to the first end 63 of the hinged joint arrangement 13. As a result, as again can be seen in FIG. 18, each mutually engagable hinge portion overlaps an opposing mutually engagable hinge portion by 50%. This results in the intersections 67 between mutually engagable hinge panels being staggered such that weak points are not present. With this assembly, the hinge arrangement stays together even without the wall panels 11, 12 attached. The refuse receptacle 10 comprises a lid 58 which is adapted to selectably close or cover the upper opening 17. The lid 58 is connected to one of the plurality of wall portions 11, 12 by a lid hinged joint 59, the hinged joint 59 being formed by cutting a hinged joint 28 in half. The hinged joints 28 are injection moulded hinged joints 28.

In use, when the refuse receptacle 10 is fully assembled, to deploy the receptacle 10 to the second configuration from the first configuration, a user would hold each wall portion 11, 12 by the centre at the top and pull said wall portions apart with sufficient force until the male engagement feature 22 of each first movement restriction member 22, 23 moves from the space 38 between the rounded projections 23*a*, 23*b* of the female engagement feature 23, over one of said rounded projections 23*a*, to one side of one of the female engagement feature 23. The user will feel a definite bump or pop when this occurs as the male engagement feature 22 moves away from the female engagement features 23 in the axial direction of the hinged joint 28, via deformation of the resilient biasing element 54, in order to pass thereover and returns to its undeformed position once passed thereover. In the preferred embodiment, the passing of the male engagement feature 22 over the rounded projection 23*a* of the female engagement feature 23 occurs when the panels are pulled to approximately 20 degrees from flat in the first configuration. Once the male engagement feature 22 has passed over rounded projection 23*a* of the female engagement feature 23, the female engagement feature acts to prevent the male engagement feature 22 moving back between the female engagement features 23 unless a force is applied to do so. This force being sufficient to deform the resilient biasing element 54 such that the male engagement feature 22 of each first movement restriction member 22, 23 may move away from the female engagement members 23 thereof in the axial direction of the hinged joint 28. In this manner, the receptacle 10 is held partially open such that it can be let go and it will stand steady in an upright position. The user would then hold the receptacle 10 at or near the hinged arrangements 13 on each side, and approximately half way down from the top 15 of the receptacle 10, and apply force to urge the hinged arrangements 13 towards each other. The user continues to apply a force which urges the hinged arrangements 13 together until the male engagement feature 24 of each second movement restriction member 24, 25 approaches the female engagement features 25 thereof and passes over one of said female engagement features 25*b* and into the space 51 between the trapezoidal features 25*a*, 25*b* of the female engagement features 25. The user will feel a definite bump or pop when this occurs as the male engagement feature 24 of the second movement restriction members 24, 25 moves away from the female engagement features 25 thereof in the axial direction of the hinged joint 28, via deformation of a resilient biasing element 54, in order to pass thereover and returns to its undeformed position once passed thereover. At this point, the receptacle 10 is fully deployed in the second configuration and can be filled with refuse as required. The receptacle 10 is held in the second configuration until a user wishes to collapse the receptacle 10 to the first configuration for storage and thus applies sufficient force to the outside of wall portions 11, 12 to remove the male engagement feature 24 of each second movement restriction member 24, 25 from the space 51 between the trapezoidal features 25*a*, 25*b* of the female engagement features 25 thereof by forcing said male engagement feature 24 over one of said female engagement features 25. This requires sufficient force to deform the resilient biasing element 54 such that the male engagement feature 24 of the second movement restriction member 24, 25 may move away from the female engagement members 25 thereof in the axial direction of the hinged joint 28. The user continues to apply force to the outside of the wall portions 11, 12 until the male engagement feature 22 of each first movement restriction member 22, 23 approaches the female engagement features 23 thereof and passes over one of said female engagement features 23*a* and into the space 38 between the female engagement features 23. The receptacle 10 then be held in the first configuration by the first movement restriction member 22, 23. It should be understood that the male and female engagement features 22, 23,24,25 are described as comprising rounded projections 22, 23 and trapezoidal features 24, 25, however the skilled person would understand that the shape of these projections would not be limited to this shape and the required functioning could be achieved with alternatively shaped projections/features.

In the preferred embodiment, the refuse receptacle 10 forms a cylindrical refuse receptacle 10 approximately 600 mm in diameter with approximately 270 litres of storage capacity. The lid 58 preferably rotates through 270 degrees to sit on top of the refuse receptacle 10 once the refuse receptacle 10 is deployed in the second configuration. In the first configuration, the lid rests along the wall portion 11, 12 to which it is attached. The cylindrical shape of the refuse receptacle 10 permits users to tightly pack and fill the receptacle 10 as they would with a normal refuse receptacle without fear of damage to the refuse receptacle 10. However, due to the materials and structure of the refuse receptacle 10 its weight is less than 5 kg, which is remarkably light for any receptacle of its size.

The hinged joints 28 are suitable for injection moulding. Two moulded parts, namely the mutually engagable hinge portions 29, 30, click together to form a single hinged joint 28. The hinged joints 28 comprise a single, mirror-image part. More specifically, the two mutually engagable hinge portions 29, 30 are moulded from the same mould. Due to the mirror image nature of the hinged joints, by simply inverting one of the mutually engagable hinge portions 29, 30 an opposing mutually engagable hinge portion may be formed. Thus two identical parts may be made from the same mould, one of these parts inverted, and the two mated to form a hinged joint 28. This results in efficient and cost effective manufacture of said hinged joints 28. Therefore, in the embodiment of the drawings, the refuse receptacle 10 comprises seventeen hinge mouldings, eight hinge mouldings for each hinged joint arrangement 13, 20, 21 and one hinged joint 28 is cut in half to form a shorter hinge 59 for the lid 58. In some embodiments, another hinged joint 28 is cut in half to allow for a 50% overlap of the hinged joints 28 as they are assembled, giving additional strength to the hinge arrangements 13, 20, 21, particularly in the fully closed position. In the embodiment of the drawings, the hinged joints 28 are bolted to the wall portions 11, 12. However, a clipping or moulding technique could be utilised to join the hinged joints 28 to the wall portions 11, 12, in particular for high volume manufacture.

The invention is not limited to the embodiment(s) described herein but can be amended or modified without departing from the scope of the present invention.

The invention claimed is:

1. A refuse receptacle comprising a plurality of wall portions joined to each other about a plurality of movable joint means, wherein the refuse receptacle comprises a first configuration, being a generally planar storage configuration, and a second configuration, wherein the wall portions are positionable relative to each other to form a receptacle having a refuse accepting space defined by said plurality of wall portions, wherein the wall portions are wall panels and each of the plurality of wall panels is joined to adjacent wall panels about the movable joint means, wherein the movable joint means are hinged joint arrangements comprising first and second mutually engagable hinge portions, wherein the refuse receptacle comprises a first movement restriction means which encourages the plurality of wall panels to remain in the first configuration, wherein the first movement restriction means comprises a first engagement feature locatable on the first or second mutually engagable hinge portion and second engagement feature locatable on the respective other mutually engagable hinge portion such that the first movement restriction means is located in its entirety on the movable joint means, and wherein in the second configuration, the bottom edges of the wall panels together define a lower opening into the refuse accepting space.

2. The refuse receptacle of claim 1 wherein each of the plurality of wall panels comprise top and bottom edges and two opposing side edges extending between their upper and lower edges such that each of the plurality of wall panels comprise generally quadrangular wall panels, and wherein said top edges of the plurality of wall panels together define an upper opening into the refuse accepting space in the second configuration, and in the second configuration, the bottom edges of the plurality of wall panels together define a lower opening into the refuse accepting space, said lower opening opposing the upper opening.

3. The refuse receptacle of claim 2, wherein each of the plurality of wall panels is joined to at least one adjacent wall panel by a movable joint means locatable along their respective side edges, and wherein the refuse receptacle comprises two wall panels joined along respective first side edges by a first movable joint means, and joined along respective second side edges by a second movable joint means, the two wall panels forming a continuous outer wall of the refuse receptacle, and wherein each of the plurality of wall panels are elastically deformable wall panels such that said each of the plurality of wall panels may bend to form a curvature in the second configuration and return to a flat/planar shape in the first configuration, and preferably wherein the plurality of wall panels bend in the second configuration such that the refuse receptacle forms a generally cylindrical shaped refuse receptacle.

4. The refuse receptacle of claim 1:

wherein the first movement restriction means is adapted to retain the plurality of wall panels in the first configuration until application of a pre-determined level of force by a user urges the plurality of wall panels out of the first configuration such that the plurality of wall panels move into an intermediate configuration between the first and second configurations, and wherein the refuse receptacle comprises a second movement restriction means which encourages the plurality of wall panels to remain in the second configuration, and wherein the second movement restriction means is adapted to retain the plurality of wall panels in the second configuration until application of a pre-determined level of force by a user urges the plurality of wall panels out of the second configuration such that the plurality of wall panels move into an intermediate configuration between the first and second configurations, and wherein the refuse receptacle comprises a third movement restriction means which acts to retain the refuse receptacle in an intermediate configuration between the first and second configurations, and wherein the first and/or second and/or third movement restriction means are locatable on the movable joint means and wherein the movable joint means are rotatable joint means and preferably hinged joint arrangements comprising one or more hinged joints.

5. The refuse receptacle of claim 3, wherein the hinged joints comprise first and second mutually engageable hinge portions and, at the joint between each adjacent set of wall panels, the first mutually engageable hinge portion of a hinged joint is attachable to the side edge of a first wall panel and the second mutually engageable hinge portion of the hinge joint is attachable to the side edge of a second wall panel, the mutually engageable hinge portions being engageable to hingedly join said first and second wall panels, and wherein the first and second mutually engageable hinge portions comprise joining members which extend partially along the inner and outer faces of the wall panels, and wherein the joining members comprise a plurality of finger portions which extend partially along the outer faces of the wall panels, said finger portions being attachable to the wall panels by mechanical fixings, adhesively, or any other suitable method, and wherein the joining members comprise plate elements which extend partially along the inner faces of the wall panels, the finger portions and plate elements of the inner and outer faces being arranged in a spaced apart relationship such that they define a gap therebetween into which the wall panels may be slid.

6. The refuse receptacle of claim 3, wherein the first and second mutually engageable hinge portions comprise at least one rotatable connection member therebetween, and preferably where each hinged joint comprises a plurality of rotatable connection members, wherein the rotatable connection members are formed on one or more of the interlocking hinge elements, and wherein the rotatable connection member comprises a shaft locatable on the first or second mutually engageable hinge portion and a shaft receiving cavity formed for receiving said shaft on the respective other mutually engageable hinge portion, such that the shaft may rotate within the shaft receiving cavity to permit relative rotation between the first and second mutually engageable hinge portions.

7. The refuse receptacle of claim 3, further comprising a first movement restriction member, wherein the first movement restriction member comprises a first engagement feature locatable on the first or second mutually engageable hinge portion and second engagement feature locatable on the respective other mutually engageable hinge portion, and wherein the first engagement feature of the first movement restriction means is a male feature and the second engagement feature thereof is a female feature such that the male feature is selectably insertable into the female feature, and wherein the first and second mutually engageable hinge portions comprise a plurality of interlocking hinge elements, and wherein the interlocking hinge elements comprise a series of protrusions and recesses formed on the first and second mutually engageable hinge portions such that the protrusions of the first mutually engageable hinge portion are insertable into the recesses of the second mutually engageable hinge portion, and the protrusions of the second mutually engageable hinge portion are insertable into the recesses of the first mutually engageable hinge portion.

8. The refuse receptacle of claim 4, wherein the first movement restriction means comprises male and female engagement features, wherein the male and female engagement features of the first movement restriction means are formed on respective opposing surfaces of one or more of the protrusions of the interlocking hinge elements such that, in use, the surfaces having said male and female engagement features oppose each other.

9. The refuse receptacle of claim 8, wherein the plane of rotation of the hinged joint is generally parallel to the plane of the opposing surfaces of the one or more of the protrusions of the interlocking hinge elements, and wherein the hinged joint is rotatable in a first direction, the first direction being a direction wherein the wall panels are rotated towards each other such that the refuse receptacle transitions towards the first configuration, the hinged joint is also rotatable in a second direction, the second direction generally opposing the first direction, the second direction being a direction wherein the wall panels are rotated away from each other such that the refuse receptacle moves towards the second configuration wherein, in use, rotation of the hinged joint in the first direction results in insertion of the male engagement feature of the first movement restriction means into the female engagement feature thereof and rotation of the hinged joint in the second direction results in removal of the said male engagement feature from said female engagement feature, and wherein the male and female engagement features of the first movement restriction means are locatable on opposing surfaces of the protrusions of the interlocking hinge elements such that when the refuse receptacle is in the first configuration said male engagement feature is inserted into the female engagement feature, and wherein the male and female engagement features of the first movement restriction means are locatable on opposing surfaces of the protrusions of the interlocking hinge elements such that rotation of the hinged joint so that the refuse receptacle is in the second configuration results in the male and female engagement features of the first movement restriction means being rotated in the same plane but in opposite directions, such that said male engagement feature is located approximately 180 degrees from the female engagement feature in the plane of rotation of the hinged joint.

10. The refuse receptacle of claim 7, wherein the female engagement feature of the first movement restriction means comprises two protruding formations defining a receiving recess therebetween, and wherein the male engagement feature of the first movement restriction means comprises a single protruding formation sized and dimensioned to be insertable into the receiving recess formed between the two protruding formations of the female engagement feature, and wherein the third movement restriction means is formed by the male engagement feature of the first movement restriction means in cooperation with an outer portion of one of the protruding formations of the female engagement feature thereof, the outer side of the female engagement feature being the side not defining the receiving recess, and abutment of the male engagement feature of the first movement restriction means against the outer side of the female engagement feature thereof prevents the refuse receptacle collapsing back to the first configuration from the intermediate configuration, and wherein the second movement restriction member comprises a first engagement feature locatable on the first or second mutually engageable hinge portion and second engagement feature locatable on the respective other mutually engageable hinge portion, and wherein the first engagement feature of the second movement restriction means is a male feature and the second engagement feature thereof is a female feature such that the male feature is selectably insertable into the female feature.

11. The refuse receptacle of claim 10, wherein the male and female engagement features of the second movement restriction means are formed on respective opposing surfaces of one or more of the protrusions of the interlocking hinge elements such that, in use, the surfaces having the male and female engagement features oppose each other.

12. The refuse receptacle of claim 11 wherein, In use, rotation of the hinged joint in the second direction results in insertion of the male engagement feature of the second movement restriction means into the female engagement feature thereof and rotation of the hinged joint in the first direction results in removal of the said male engagement feature from the female engagement feature, and wherein the male and female engagement features of the second movement restriction means are locatable on opposing surfaces of the protrusions of the interlocking hinge elements such that when the refuse receptacle is in the second configuration said male engagement feature is inserted into the female engagement feature, and wherein the male and female engagement features of the second movement restriction means are locatable on opposing surfaces of the protrusions of the interlocking hinge elements such that rotation of the hinged joint so that the refuse receptacle is in the first configuration results in the male and female engagement features being rotated in the same plane but in opposite directions, such that the male engagement feature is located approximately 180 degrees from the female engagement feature, and wherein the female engagement feature of the second movement restriction means comprises two protruding formations defining a receiving recess therebetween, and wherein the male engagement feature of the second movement restriction means comprises a single protruding formation sized and dimensioned to be insertable into the receiving recess formed between the two protruding formations of the female engagement feature of the second movement restriction means.

13. The refuse receptacle of claim 10, wherein a resilient biasing means biases the male and/or female engagement features of the first and second movement restriction means towards the respective other engagement feature, and wherein the resilient biasing means biases the male and/or female engagement features of the first and second movement restriction means towards the respective other engagement feature when the male and female engagement features engage each other, and wherein the resilient biasing means biases the male engagement features of the first and second movement restriction means towards their respective female engagement features as the male engagement features engage with and travel over one of the protruding elements of the female engagement features into the receiving recesses thereof, and wherein the resilient biasing means biases the male engagement features of the first and second movement restriction means towards their respective female engagement features as the male engagement features engage with and travel over one of the protruding elements of the female engagement features and out of the receiving recesses thereof, and wherein the resilient biasing means results in a level of friction between the male and female engagement features such that a user must exert a predetermined level of force to rotate the hinged joint such that the male engagement feature is inserted into the female engagement feature, and similarly a user must exert a predetermined level of force to rotate the hinged joint such that the male engagement feature is removed from the female engagement feature.

14. The refuse receptacle of claim 12, wherein the protrusions of the first and second mutually engageable hinge portions, on which the male and female engagement features of the first and second movement restriction member are formed, comprise a slot formed therein between first and second sides thereof, the slot defining first and second protrusion portions, and wherein the first and/or second protrusion portions are deformable towards each other, said deformation being aided by the slot as the material of the first and second protrusion portions may deform into the space provided by the slot, and wherein the protrusions of the first and second mutually engageable hinge portions are elastically deformable such that, upon deformation of the first and/or second protrusion portions, said first and/or second protrusion portions return to their undeformed shape, and wherein when the male and female engagement features of the first movement restriction means are engaged such that the male engagement feature is inserted into the female engagement feature, the male and female engagement features of the second movement restriction means are rotated, in plane, such that they are approximately 180 degrees apart.

15. The refuse receptacle of claim 2, wherein the refuse receptacle comprises an upper closure which is adapted to selectably close or cover the upper opening, preferably the upper closure comprises a lid connected to one of the plurality of wall portions by a lid hinged joint, the hinged joint being of the same type as described in relation to those which join adjacent wall panels.

16. The refuse receptacle of claim 1 wherein the plurality of wall panels extend generally parallel to and/or co-planar with each other in the first configuration.

17. A hinged joint for use in a refuse receptacle of claim 1.

18. A method of manufacturing a refuse receptacle comprising the steps of: providing a plurality of wall portions having top and bottom edges and two opposing side edges extending between their upper and lower edges such that each of the plurality of wall portions comprise generally quadrangular wall portions, joining each of the plurality of wall portions to adjacent wall portions about a movable joint means to form a refuse receptacle comprising a first configuration, being a generally planar storage configuration, and a second configuration, wherein the movable joint means are hinged joint arrangements comprising first and second mutually engagable hinge portions, wherein the wall portions are positionable relative to each other to form a receptacle having a refuse accepting space defined by said plurality of wall portions, wherein the wall portions are wall panels and each of the plurality of wall panels is joined to adjacent wall panels about the movable joint means; forming a movement restriction means on the movable joint means which encourages the plurality of wall panels to remain in the first configuration, wherein the movement restriction means comprises a first engagement feature locatable on the first or second mutually engagable hinge portion and second engagement feature locatable on the respective other mutually engagable hinge portion such that the first movement such that the first movement restriction means is located in its entirety on the movable joint means, and wherein In the second configuration, the bottom edges of the wall panels together define a lower opening into the refuse accepting space.

19. The refuse receptacle of claim 3, wherein a plurality of hinged joints can be combined to form the hinged joint arrangement.

* * * * *